(12) United States Patent
Nakano (10) Patent No.: US 6,455,976 B1
(45) Date of Patent: Sep. 24, 2002

(54) MOTOR/GENERATOR WITH SEPARATED CORES

(75) Inventor: Masaki Nakano, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/670,617

(22) Filed: Sep. 27, 2000

(30) Foreign Application Priority Data

Sep. 27, 1999 (JP) ............................. 11-273364
Aug. 2, 2000 (JP) .......................... 2000-234394

(51) Int. Cl.$^7$ .................. H02K 16/00; H02K 16/02; H02K 7/20; H02K 17/44; H02K 19/38; H02K 47/00; H02K 3/48; H02K 1/00; H02K 1/18; H02K 2/18; H02K 1/12

(52) U.S. Cl. .................. 310/254; 310/114; 310/112; 310/259; 310/218; 310/216; 310/214

(58) Field of Search ................... 310/254, 255, 310/260, 214, 261, 257, 258, 259, 218, 216, 112, 114

(56) References Cited

U.S. PATENT DOCUMENTS

| | | | |
|---|---|---|---|
| 4,297,604 A | * 10/1981 | Tawse | 310/168 |
| 4,361,776 A | * 11/1982 | Hayashi et al. | 310/268 |
| 4,503,347 A | * 3/1985 | Bergman | 310/68 C |
| 4,656,381 A | * 4/1987 | Komatsu | 310/257 |
| 4,668,884 A | * 5/1987 | Amao et al. | 310/68 R |
| 4,695,795 A | * 9/1987 | Nakamizo et al. | 324/208 |
| 4,841,190 A | * 6/1989 | Matsushita et al. | 310/257 |
| 4,851,731 A | * 7/1989 | Saotome et al. | 310/258 |
| 5,063,320 A | * 11/1991 | Watanabe et al. | 310/270 |
| 5,258,676 A | * 11/1993 | Reinhardt et al. | 310/112 |
| 5,272,401 A | * 12/1993 | Lin | 310/49 R |
| 5,325,007 A | * 6/1994 | Huss et al. | 310/180 |
| 5,751,086 A | * 5/1998 | Taghezout | 310/112 |
| 5,763,978 A | * 6/1998 | Uchida et al. | 310/215 |
| 5,877,572 A | * 3/1999 | Michaels et al. | 310/179 |
| 5,939,813 A | * 8/1999 | Schob | 310/254 |
| 6,008,563 A | * 12/1999 | Baba et al. | 310/254 |
| 6,049,152 A | 4/2000 | Nakano | 310/114 |
| 6,081,059 A | * 6/2000 | Hsu | 310/179 |
| 6,198,182 B1 | * 3/2001 | Bustamante et al. | 310/49 R |

* cited by examiner

Primary Examiner—Nestor Ramirez
Assistant Examiner—Julio C. Gonzalez
(74) Attorney, Agent, or Firm—Foley & Lardner (57) ABSTRACT

A motor/generator is provided with a stator (14) and rotors (2, 3). The stator (14) comprises a plurality of cores (11, 12) arranged on a circle. Each core (11, 12) has a base (11A, 12A) of a trapezoidal cross-section which increases a width in a direction away from the center of the stator (14). Deformation of the cores (11, 12) towards the center of the stator (14) is limited by retaining plates (18) each of which is engaged with the bases (11A, 12A) of adjacent cores (11, 12). The retaining plates (18) are formed to have a trapezoidal cross-section which increases a width in a direction towards the center of the stator (14). Rings (21, 22) are press fitted to an inner side of the both ends of the retaining plates (18). Preferably a reinforcing ring (25) is provided to support the inner periphery of the retaining plates (18).

13 Claims, 9 Drawing Sheets

MOTOR/GENERATOR WITH SEPARATED CORES

FIELD OF THE INVENTION

This invention relates to a supporting structure for separated stator cores in a motor or generator.

BACKGROUND OF THE INVENTION

A stator of a motor or generator is provided with a plurality of cores for example disposed at equal angular intervals in a radial direction. Winding of wire is performed on each core. As a result, apart from a space required to simply store the wire, a space is required between two adjacent cores in order to perform the winding process.

A motor/generator is known in which the cores are separated in order to reduce this space. In a separated core motor/generator, the cores are separated in the direction of a circular periphery and cores pre-wound with wire are joined to form the stator.

SUMMARY OF THE INVENTION

However, a stator using separated cores is more complex in its shape and structure than a stator using non-separated stator cores. The cores are generally formed by lamination of pressed plate members, and the use of separated cores requires high pressing accuracy at the connecting section. Such a demand on accuracy may shorten the component life of the pressing mold.

In order to avoid the complexity of the separated core shape or structure, the separated cores may be joined by welding. However, welding can adversely affect the magnetic properties of a core.

It is therefore an object of this invention to simplify the joining of the separated cores.

In order to achieve the above object, this invention provides a motor/generator comprising a stator having a plurality of cores arranged on a circle, a rotor rotating on an inner side of the stator, a plurality of retaining plates, a case which prevents a displacement of the cores in the direction away from a center of the stator, and a pair of ring-shaped fixing members facing each other.

Each of the cores comprises a base which increases a width in a direction away from the center of the stator, and the retaining plates support the bases of the cores so as to prevent a displacement of the cores in the direction towards the center of the stator. The ring-shaped fixing members respectively hold ends of the retaining plates.

The details as well as other features and advantages of this invention are set forth in the remainder of the specification and are shown in the accompanying drawings.

DESCRIPTION OF THE PREFERRED EMBODIMENTS

Figure 1:
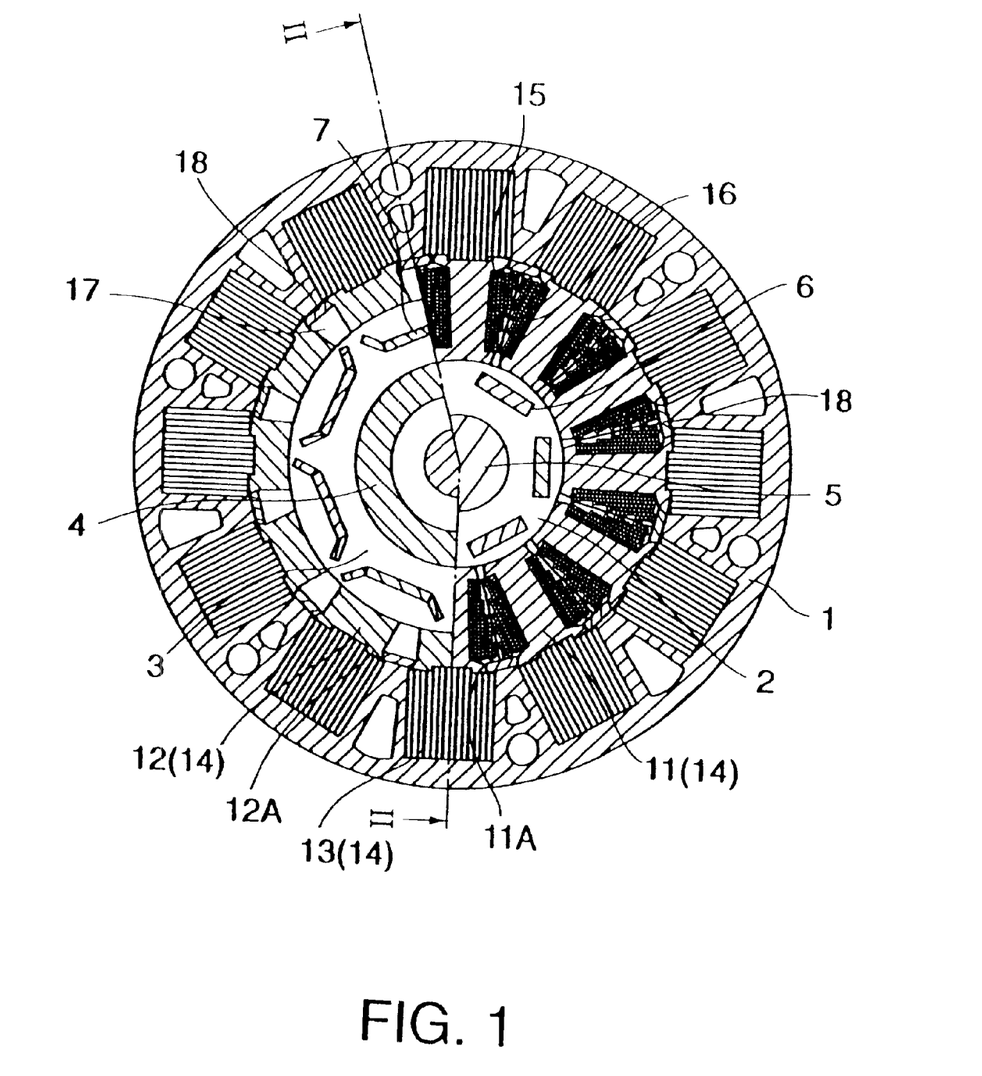
FIG. 1 is a lateral cross-sectional view of a separated-core motor according to this invention.

Referring to FIG. 1 of the drawings, a multi-shaft motor with separated cores according to this invention is a composite current driven multi-shaft motor comprising a first rotor 2, a second rotor 3 and a stator 14 disposed in a case 1.

Figure 2:
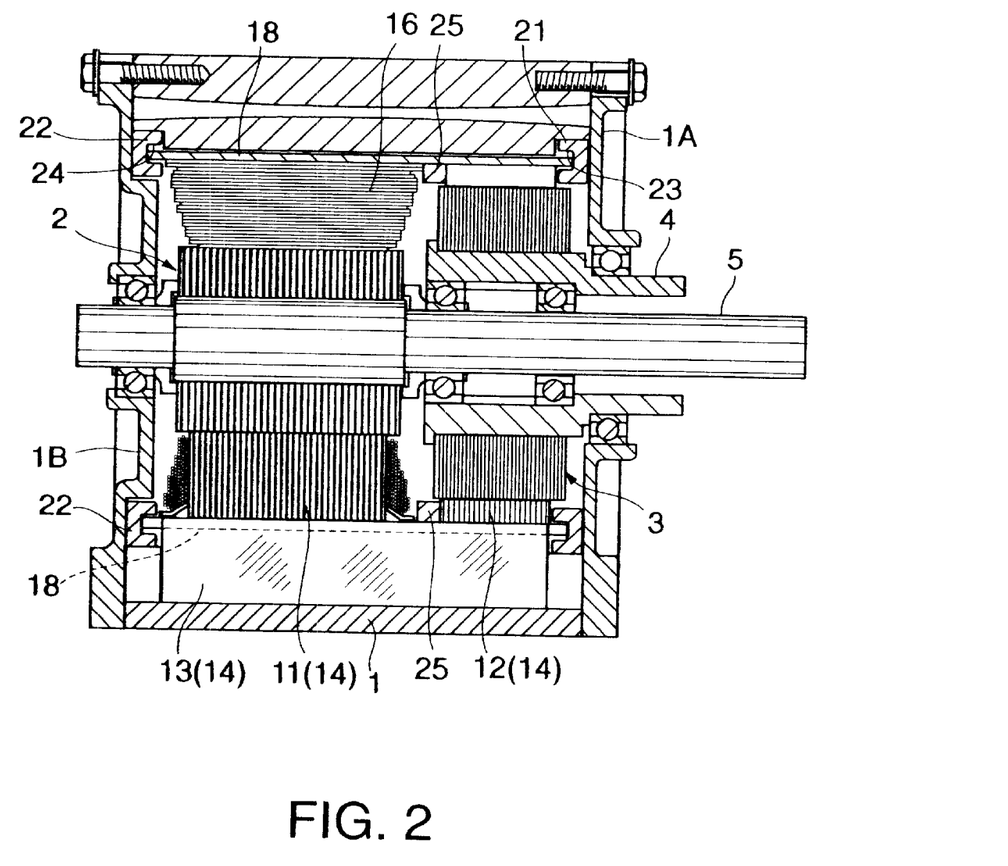
FIG. 2 is a longitudinal cross-sectional view of the separated-core motor taken along the line II—II in FIG. 1.

The first rotor 2 is provided with six magnets 6 disposed at equal angular intervals about an output shaft 5. These magnets have N-poles and S-poles alternatively arranged on the outer periphery of the first rotor 2. The second rotor 3 is provided with eight magnets 7 disposed at equal angular intervals about an output shaft 4. These magnets have N-poles and S-poles alternatively arranged on the outer periphery of the first rotor 3. The output shaft 4 has a cylindrical shape and is supported co-axially by a bearing on an outer side of the output shaft 5. The first rotor 2 and the second rotor 3 are disposed in series in an axial direction as shown in FIG. 2.

The stator is formed by three core groups A, B, C.

The group A is comprised by twelve cores 11 disposed on a circle at regular intervals. Group A cores are disposed co-axially on an outer side of the first rotor 2. A stator coil 16 is previously wound on each core 11. A space 15 for accommodating coil wires is provided between adjacent cores 11. Group B is comprised by twelve cores 12 disposed on a circle at regular intervals in the same manner as Group A above.

Group B cores are disposed co-axially on an outer side of the second rotor 3. Although a fixed space 17 is provided between the cores 12, winding of wire is not performed on the cores 12.

Group C is comprised by twelve cores 13 disposed on a circle at regular intervals in the same manner as Groups A and B above. Group C cores are disposed co-axially on an outer side of the core 11 of Group A and the core 12 of Group B. The core 13 is fitted into a slot on an inner periphery of a cylindrical case 1 formed by a non-magnetic body. A wall face of the non-magnetic body is interposed between two adjacent cores 13. Winding of wire is not performed on the core 13.

The cores 11, 12, 13 are disposed at the same angular positions about the output shaft 5. That is to say, as shown in FIG. 1, the core 11 and the core 13 are layered in a radial direction and the cores 12 and 13 are also layered in a radial direction. Each core 11 and 12 is comprised by a plate member laminated in the direction of the output shaft 5. Each of the cores 13 is comprised by a plate member laminated in the circumferential direction of the case 1.

The multi-shaft motor independently drives the first rotor 1 and the second rotor 2 by application of a composite current to the stator coil 16. The principle of this type of motion is disclosed for example in U.S. Pat. No. 6,049,152.

The supporting structure of the core 11 of Group A and the core 12 of Group B will be described below.

Bases 11A and 12A having slanted surfaces extruding in lateral directions are formed on outer peripheries of the cores 11 and 12. The cores 11 and 12 are retained in the case 1 by retaining plates 18 engaged to the bases 11A and 12A, and the core 13 disposed on the outer side of the cores 11 and 12. The retaining plates 18 are band-shaped members with a trapezoidal cross-section and disposed at equal angular intervals in parallel with the output shaft 5. Each retaining plate 18 is gripped by two adjacent bases 11A of the cores 11 and in the same manner, is gripped by two adjacent bases 12A of the cores 12.

Referring now to FIG. 2, both ends of the retaining plate 18 are engaged with the rings 21, 22. The ring 21 is provided with a ring groove 23 and the ring 22 is provided with a ring groove 24. The ends of the retaining plate 18 engage with these ring grooves 23 and 24. As shown in FIG. 1, a total of twelve retaining plates 18 are disposed on the same circle on which the bases 11A and 12A are disposed, and the slated surfaces of the retaining plates 18 corresponding to the oblique lines of the trapezoid are in contact with the slanted surfaces of the bases 11A and 12A.

Figure 3:
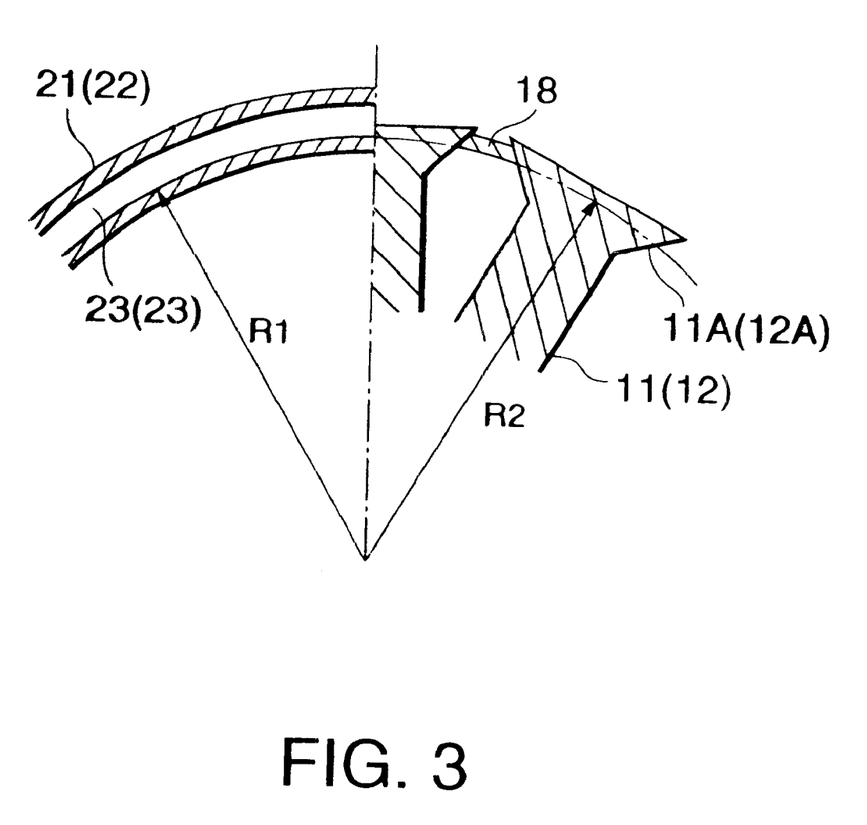
FIG. 3 is a lateral cross-sectional view of essential parts of the separated-core motor describing a positional relationship between an arc-shaped groove and a fixing plate according to this invention.

Referring now to FIG. 3, the ring grooves 23 (24) are provided with an outer and inner walls facing with each other. A radius R1 of the inner wall of the ring grooves 23 and 24 is set to be slightly greater than a radius R2 of the circle formed by the inner peripheral faces of the retaining plates 18. On the other hand, as shown in FIG. 2, a reinforcing ring 25 supports the inner periphery of the retaining plates 18 in order to prevent deformation of the retaining plates 18 towards the output shaft 5. The outer periphery of the reinforcing ring 25 is set to equal the radius R2. The reinforcing ring 25 is disposed in the space between the cores 11 and cores 12.

When the motor is assembled, a stator comprised from the cores 11, 12, 13 of the groups A, B, C, the first rotor 2, the second rotor 3 and the output shafts 4 and 5 are disposed in the case 1 as shown in FIG. 1. The inner walls of the ring grooves 23 and 24 are press fitted into the inner periphery of the retaining plates 18, and the end plates 1A and 1B are fixed to both side faces of the case 1 by bolts. It should be noted that the rings 21 and 22 are not necessarily fixed to the end plates 1A and 1B.

A force in a radial direction acts on the retaining plates 18 as a result of the press fitting of the ring grooves 23 and 24 on the ends of the retaining plates 18. The force deforms both ends of the retaining plates outward, that is to say, in a direction away from the output shaft 5. The central section of the retaining plates 18 displays a tendency to bend inward or towards the output shaft 5 as a result of this deformation.

However the reinforcing ring 25 prevents the retaining plates 18 from bending inwardly. Therefore the displacement of the cores 11 and 12, which engages with the retaining plates 18 at the bases 11A and 12A, towards the output shaft 5 is also prevented.

Furthermore the outer peripheries of the cores 11 and 12 abut with the cores 13 which are fitted in the case 1, so the outward displacement of the cores 11 and 12, i.e., the displacement in a direction away from the output shaft 5 is also prevented. In this way,the cores 11 and 12 are accurately retained in fixed positions in the case 1. By intervening the retaining plates 18, the cores 11 and 12 need not to have a special shape or structure to join to the adjacent cores.

In this way, by the use of the retaining plates 18, the structure of the motor can be simplified. It should be noted that the reinforcing ring 25 also has the function of maintaining the intervals in the direction of the output shaft 5 of the cores 11 and 12 in addition to the function of preventing deformation of the retaining plates 18.

In this embodiment, although both ends of the retaining plates 18 are supported by the ring grooves 23 and 24 formed in the rings 21 and 22, the retaining plates 18 only abut with the inner walls of the ring grooves 23 and 24. This type of wall may also be obtained by forming the rings 21 and 22 in an "L" shape or by welding a short cylindrical member to the end plates 1A and 1B as rings 21 and 22.

Figure 4:
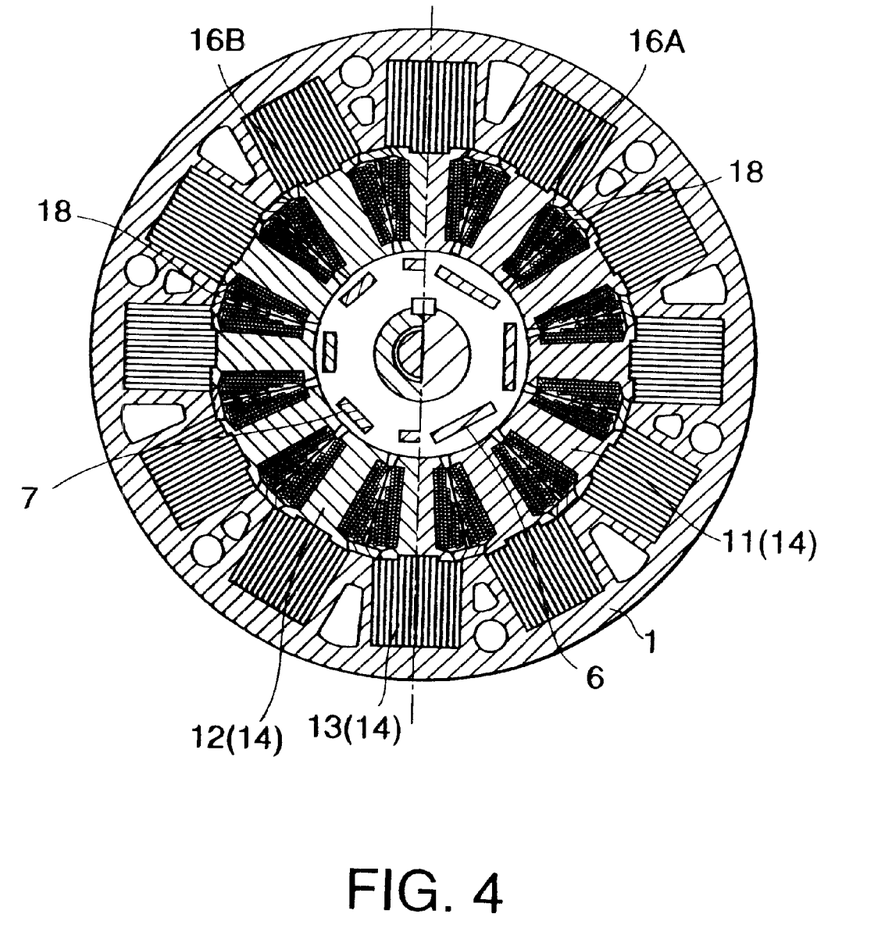
FIG. 4 is a lateral cross-sectional view of a separated-core motor according to a second embodiment of this invention.
Figure 5:
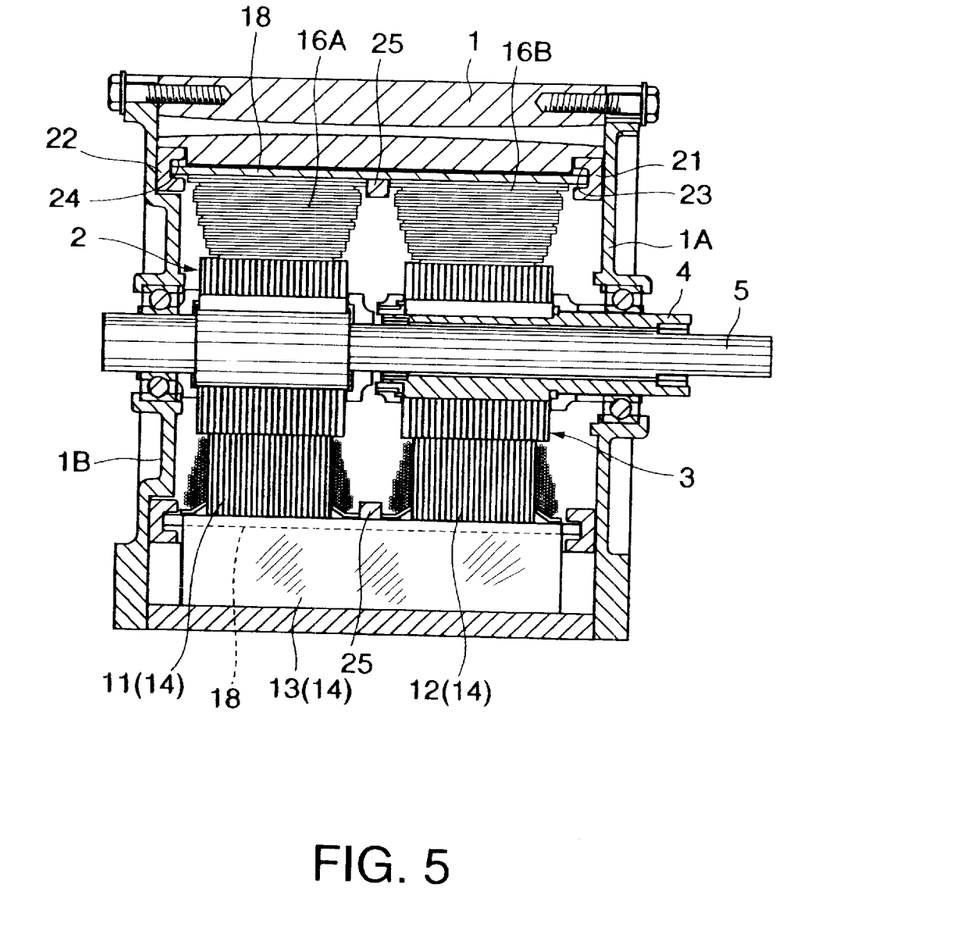
FIG. 5 is a longitudinal cross-sectional view of the separated-core motor according to the second embodiment of this invention.

A second embodiment of this invention will now be described referring to FIG. 4 and FIG. 5. In this embodiment, the core 12 of group B has the same structure as the core 11 of group A. Stator coils 16A and 16B are previously wound on each core 11 and 12. The cores of each group are integrated by assembly into the case 1. The structure of the first rotor 2 and the second rotor 3 is the same as that described with reference to the first embodiment. The cores 11 and 12 are magnetically connected through a core 13 of group C. As a result, the magnetic field formed by the stator coil 16A with respect to the first rotor 2 is oriented in an opposite direction to the magnetic field formed by the stator coil 16B with respect to the second rotor 3.

In this second embodiment as in the first embodiment above, the retaining plates 18 are engaged respectively between the base 11A adjacent to the core 11 and the base 12A adjacent to the core 12. Both ends of the retaining plates 18 are engaged with the rings 21 and 22 as in the same manner as the first embodiment. A reinforcing ring 25 is disposed between the cores 11 and 12 to support the inner periphery of the retaining plates 18.

Figure 6:
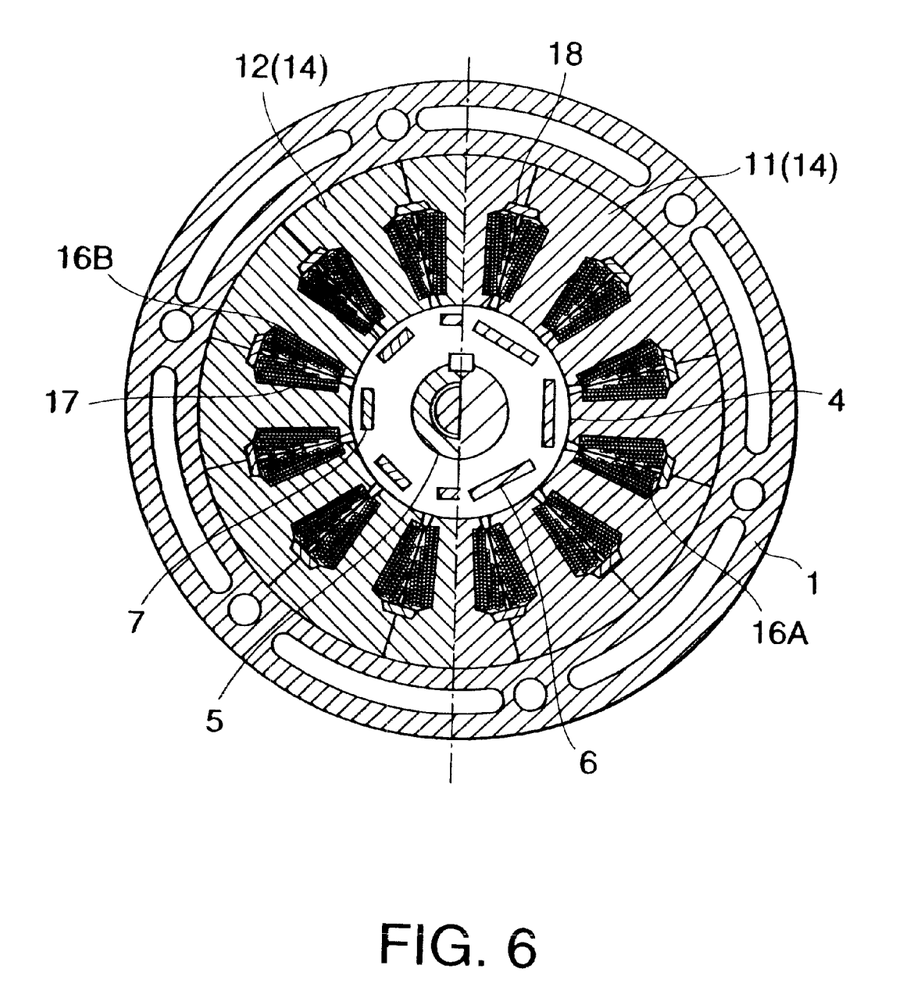
FIG. 6 is a lateral cross-sectional view of a separated-core motor according to a third embodiment of this invention.
Figure 7:
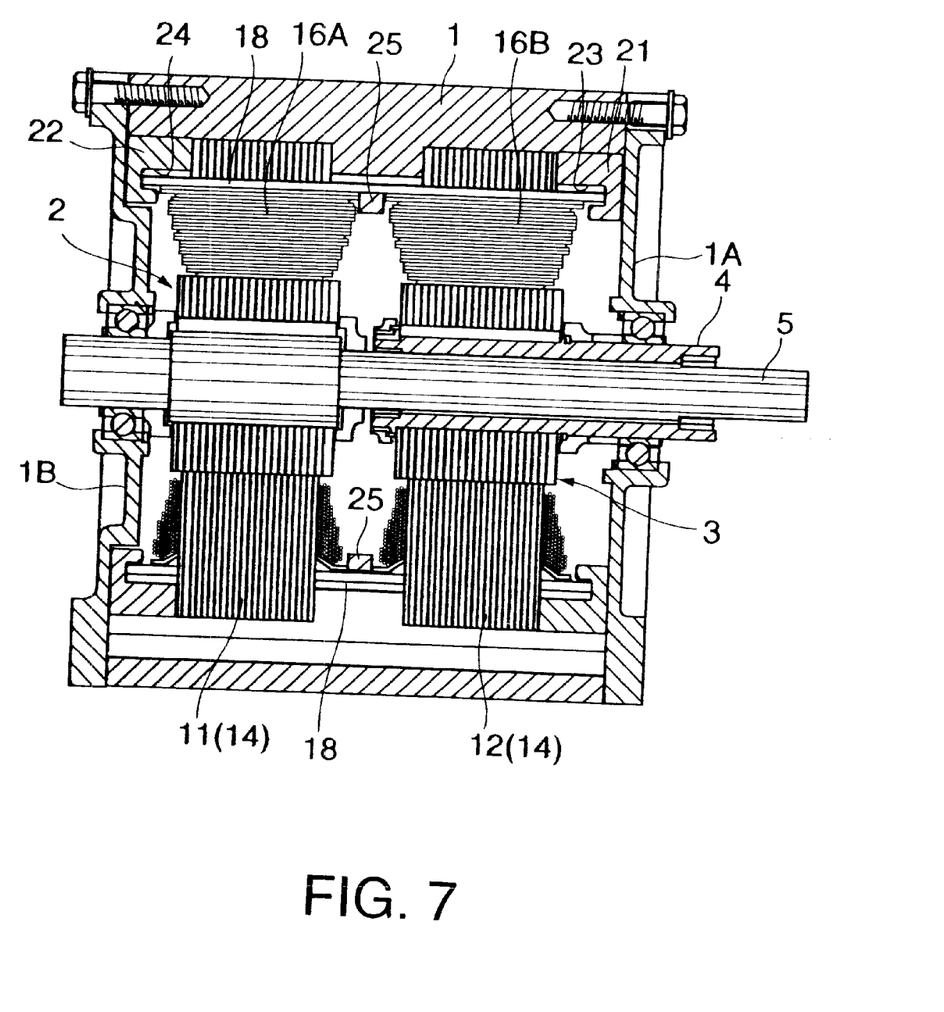
FIG. 7 is a longitudinal cross-sectional view of a separated-core motor according to the third embodiment of this invention.

A third embodiment of this invention will now be described referring to FIG. 6 and FIG. 7.

A motor with separated cores according to the third embodiment disposes a double-unit motor independently in the case 1. The first rotor 2 and the second rotor 3 are supported by the output shaft 4 and the output shaft 5 in the case 1 in the same manner as the first and second embodiments. The motor according to this embodiment does not comprise the cores of group C. The bases 11A and 12A of the cores 11 and 12 abut and make direct contact with an inner periphery of the case 1. The reinforcing ring 25 is disposed between the cores 11 and 12 in order to support the inner periphery of the retaining plates 18. In this motor, the first rotor 2 and the second rotor 3 are driven separately by supplying a composite current from a common inverter to the stator coils 16A and 16B.

The principle of this motion is disclosed in the above-mentioned U.S. Pat. No. 6,049,152. Retaining plates 18 are respectively engaged between the bases 11A of the cores 11 and between the bases 12A of the cores 12. Both ends of the retaining plates 18 are engaged with the rings 21 and 22 as in the same manner as the first embodiment.

In this embodiment, the inward displacement of the cores 11 and 12 is also prevented by the retaining plates 18. The outward displacement of the cores 11 and 12 is limited by the case 1.

Figure 8:
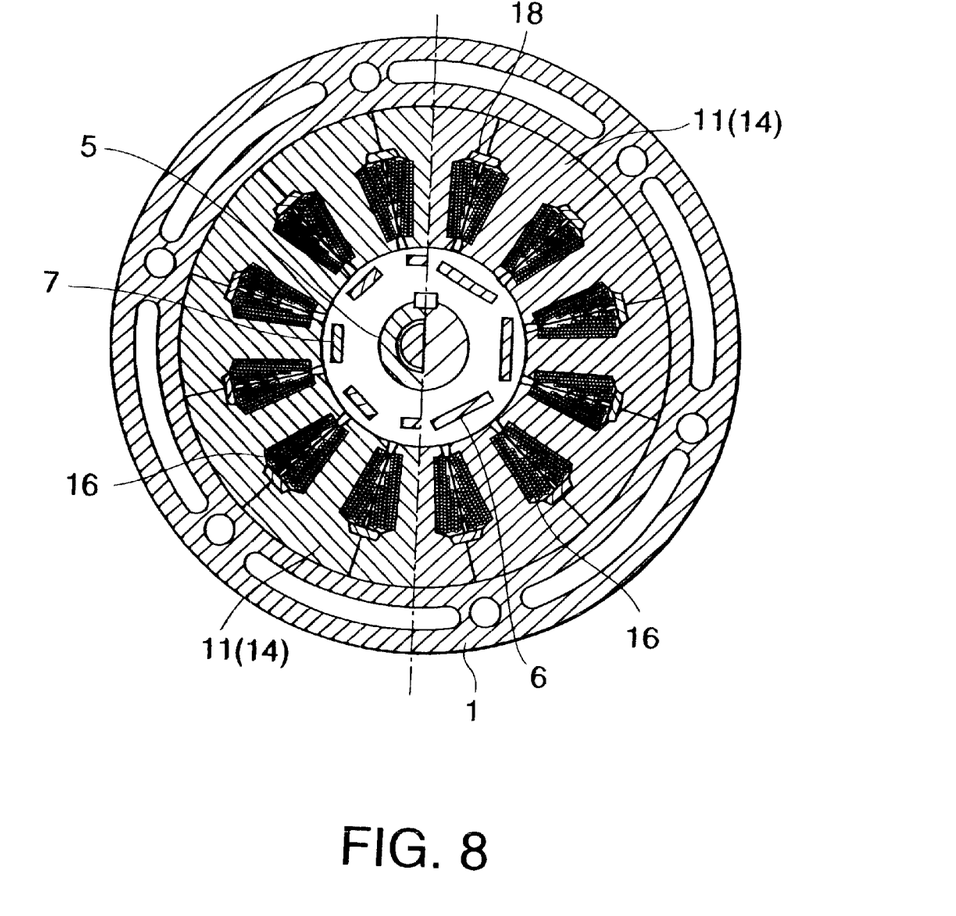
FIG. 8 is a lateral cross-sectional view of a separated-core motor according to a fourth embodiment of this invention.
Figure 9:
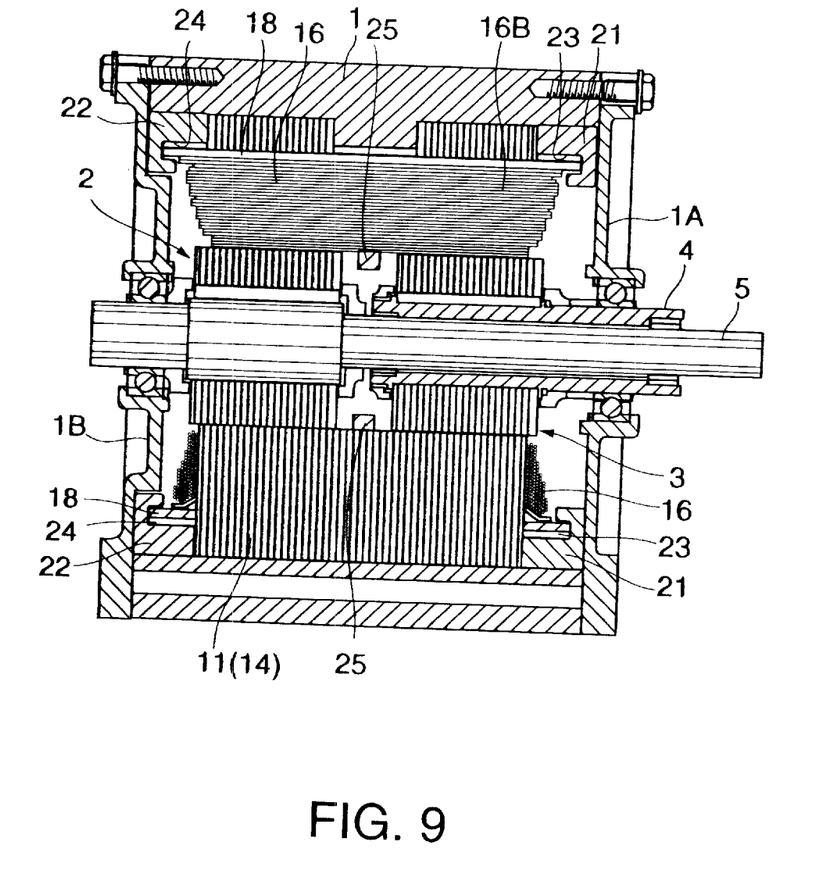
FIG. 9 is a longitudinal cross-sectional view of the separated-core motor according to the fourth embodiment of this invention.

A fourth embodiment of the present invention will now be described referring to FIG. 8 and FIG. 9.

In this embodiment, the stator is comprised only by the cores 11 of group A. The first rotor 2 and the second rotor 3 are independently rotated by supplying a composite current to the stator coils 16 wound onto the cores 11. The principle of this motion is also disclosed in the above mentioned U.S. Pat. No. 6,049,152.

The structure of the output shafts 4 and 5 and the first rotor 2 and second rotor 3 is the same as that described with reference to the second embodiment and the third embodiment. The retaining plates 18 are engaged with the bases 11A of the cores 11. Both ends of the retaining plates 18 are engaged with the ring 21 and 22 of the end plates 1A and 1B as in the same manner as the first embodiment. The bases 11A of the cores 11 have direct contact with the inner periphery of the case 1 in the same manner as described with respect to the third embodiment. The reinforcing ring 25 is disposed between the first rotor 2 and the second rotor 3 to make contact with the inner periphery of the cores 11.

The following arrangements may further be applied to any of the above embodiments.

(1) By selectively applying retaining plates 18 of various thickness, manufacturing errors in the dimensions of the cores 11 and 12 can be absorbed.

(2) An inward force which the retaining plates 18 exert on the cores 11 and 12 towards the output shaft 5, is generated in response to differences between the radius R1 of the inner wall and the radius R2 of the circle corresponding to the inner periphery of the retaining plates 18. The manufacturing errors in the retaining plates 18 or the ring 21, 22 may be absorbed by selective application of a plurality of rings 21 and 22 of varying radii R1. Thus the inward force applied by the retaining plates 18 on the core 11 or the core 12 can be regulated to be constant.

(3) Retaining plates 18 are formed by a high rigidity material such as stainless steel, while the rings 21 and 22 are formed by a low rigidity material as such aluminum. In such a manner, the fixed rings 21 and 22 which are press fitted on an inner side of the retaining plates 18 are deformed by compression and a force is applied in an outer radial direction of the retaining plates 18.

The contents of Tokugan Hei 11-273364 with a filing date of Sep. 27, 1999 in Japan, Tokugan 2000-234394 with a filing date of Aug. 2, 2000, in Japan, and U.S. Pat. No. 6,049,152 are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, each of the embodiments above has been described as applied to an electric motor. However this invention may be applied to a generator provided with separated cores. Alternatively, it is possible to apply this invention to a composite type apparatus driving a rotor with an electrical force generated by a stator by mechanically rotating the other rotor.

For example, in the above embodiments, one retaining plate supports the bases of adjacent cores. However, two retaining plates may be provided between the adjacent cores such that each retaining plate supports only one of the bases of the cores.

What is claimed is:

1. A motor/generator comprising,
   a stator having a plurality of cores separated from each other and arranged on a circle, each of the cores comprising a base which increases a width in a direction away from a center of the stator;
   a rotor rotating on an inner side of the stator, the rotor having a rotation axis;
   a plurality of retaining plates in a band shape each of which is disposed in parallel with the rotation axis and penetrates a space formed between the bases of adjacent cores in a direction of the rotation axis, both ends of each retaining plate protruding from the space, the retaining plates supporting the bases of the cores so as to prevent a displacement of the cores in the direction towards the center of the stator;
   a case which prevents a displacement of the cores in the direction away from the center of the stator; and
   a pair of ring-shaped fixing members disposed on the outer side of the stator in the direction of the rotation axis so as to face each other and respectively holding the ends of the retaining plates protruding from the space in the direction of the rotation axis.

2. A motor/generator as defined in claim 1, wherein each of the retaining plates is engaged with the bases of adjacent cores.

3. A motor/generator comprising:
   a stator having a plurality of cores separated from each other and arranged on a circle, each of the cores comprising a base which increases a width in a direction away from a center of the stator;
   a rotor rotating on an inner side of the stator;
   a plurality of retaining plates which support the bases of the cores so as to prevent a displacement of the cores in the direction towards the center of the stator;
   a case which prevents a displacement of the cores in the direction away from the center of the stator; and
   a pair of ring-shaped fixing members facing each other and respectively holding ends of the retaining plates,
   wherein each of the retaining plates is engaged with the bases of adjacent cores, and
   wherein the bases are formed to have a trapezoidal cross-section which increases a width in the direction away from the center of the stator, and the retaining plates are formed to have a trapezoidal cross-section which increases a width in the direction towards the center of the stator.

4. A motor/generator as defined in claim 1, wherein the ring-shaped fixing members are respectively press fitted to an inner side of the ends of the retaining plates so as to exert a radial force on the ends of the retaining plates.

5. A motor/generator as defined in claim 4, wherein a radius R1 of an outer periphery of the ring-shaped fixing members is set to be greater than a radius R2 of an inner periphery of the retaining plates.

6. A motor/generator as defined in claim 4, wherein each of the ring-shaped fixing members comprises a ring groove which receives the ends of the retaining plates.

7. A motor/generator comprising:
   a stator having a plurality of cores separated from each other and arranged on a circle, each of the cores comprising a base which increases a width in a direction away from a center of the stator;
   a rotor rotating on an inner side of the stator;
   a plurality of retaining plates which support the bases of the cores so as to prevent a displacement of the cores in the direction towards the center of the stator;
   a case which prevents a displacement of the cores in the direction away from the center of the stator; and
   a pair of ring-shaped fixing members facing each other and respectively holding ends of the retaining plates,
   wherein the stator comprises cores of a first group disposed on a circle and cores of a second group which are disposed on another circle in series with the cores of the first group, and the motor/generator further comprises a reinforcing ring disposed between the cores of the first group and the cores of the second group to support an inner periphery of the retaining plates.

8. A motor/generator as defined in claim 7, wherein the stator further comprises cores of a third group which electromagnetically connects the cores of the first group and the cores of the second group, the cores of the third core group being disposed on an outer side of the cores of the first group and the cores of the second group.

9. A motor/generator as defined in claim 8, wherein the cores of the third group are fitted into slots formed in the case and abut with an outer periphery of the cores of the first core group and the cores of the second core group.

10. A motor/generator as defined in claim 1, wherein the rotor is provided with a rotation shaft and two rotor units separated in a direction towards the rotation shaft, and the motor/generator further comprises a reinforcing ring which is disposed between the two rotation units and supports an inner periphery of the stator.

11. A motor/generator as defined in claim 1, wherein the cores comprise cores each of which has a coil previously wound by concentrated winding.

12. A motor/generator as defined in claim 1, wherein each of the retaining plates are made from a high rigidity material, and
wherein the pair of ring-shaped fixing members are made from a low rigidity material.

13. A motor/generator as defined in claim 12, wherein the high rigidity material is stainless steel, and
wherein the low rigidity material is aluminum.

* * * * *